United States Patent [19]

Suzuki et al.

[11] Patent Number: 5,248,736
[45] Date of Patent: Sep. 28, 1993

[54] PROCESS FOR PRODUCING DIENE POLYMER WITH ALKALINE EARTH METAL

[75] Inventors: Fumitoshi Suzuki, Yokohama; Yoshihiro Chino, Koshigaya, both of Japan

[73] Assignee: Nippon Zeon Co., Ltd., Tokyo, Japan

[21] Appl. No.: 850,804

[22] Filed: Mar. 13, 1992

[30] Foreign Application Priority Data

Mar. 18, 1991 [JP] Japan .................................. 3-78467

[51] Int. Cl.$^5$ ...................... C08C 19/36; C08C 19/20; C08C 19/22
[52] U.S. Cl. .................................. 525/346; 525/347; 525/348; 525/351; 525/352; 525/375
[58] Field of Search ............... 525/346, 347, 348, 351, 525/352, 375, 379, 382

[56] References Cited

U.S. PATENT DOCUMENTS

4,647,625 3/1987 Aohuma ............................. 525/352

FOREIGN PATENT DOCUMENTS

0150479 8/1985 European Pat. Off. .
1284189 3/1961 France .
1294890 11/1972 United Kingdom .

OTHER PUBLICATIONS

CA77(8):49209d, "Polymers With Terminal Functional Groups," Petrov, et al., U.S.S.R., 1972, SU3301-78-240272.

*Primary Examiner*—Christopher Henderson
*Attorney, Agent, or Firm*—Sherman and Shalloway

[57] ABSTRACT

There are provided a process for producing a diene polymer having markedly improved tensil strength and wear resistance and further having improved heat build-up, refound resilience, processability and wet skid resistance, as well as a rubber composition containing said diene polymer and having improved tensil strength, wear resistance, etc. Said diene polymer is produced by polymerizing a conjugated diene monomer or a mixture of the conjugated diene monomer and an aromatic vinyl monomer in a hydrocarbon solvent using a composite initiator containing an alkaline earth metal, and reacting active ends of the obtained active diene polymer with (a) a compound represented by the formula $M=C=M$ (wherein M denotes an oxygen atom or a sulfur atom) or (b) N-substituted aminoketone, N-substituted thioaminoketone, N-substituted aminoaldehyde, N-substituted thioaminoaldehyde or a compound having an atomic group in a molecule represented by the formula $-C(=M)-N<$ in a molecule.

6 Claims, No Drawings

PROCESS FOR PRODUCING DIENE POLYMER WITH ALKALINE EARTH METAL

BACKGROUND OF THE INVENTION

1. Field of the Invention

This invention relates to a process for producing a diene polymer having markedly improved tensile strength and wear resistance and further having improved heat build-up, rebound resilience, processability and wet skid resistance.

Moreover, this invention relates to a rubber composition having improved tensile strength, wear resistance, etc., and more specifically to a rubber composition containing a terminal diene polymer having a high content of a trans-1,4 bond of a conjugated diene moiety.

2. Description of the Prior Art

Heretofore, diene rubbers have been used as a main material in large-sized tires of trucks, buses, aircraft, etc. Among the diene rubbers, natural rubbers are effective for improving heat build-up and tensile strength, styrene-butadiene copolymer rubbers for improving wear resistance and crack resistance, and polybutadiene rubbers having a high cis content for improving wear resistance, respectively. Rubber compositions containing suitable amounts of two or more of these diene rubber materials have been so far used according to improving purposes. For instance, regarding a rubber in a tread portion of a large-sized tire, a rubber composition comprising a natural rubber as a main component and blended therewith, a polybutadiene rubber having a high cis content has been generally used because a load exerted on the tread portion is quite high.

By the way, wear resistance and crack resistance, important properties of a large-sized tire, are contradictory properties. Accordingly, in the composition comprising the natural rubber and the polybutadiene rubber having the high cis content, when the amount of the polybutadiene rubber is increased, wear resistance is improved, but crack resistance is decreased; when the amount of the polybutadiene rubber is decreased, improvement in wear resistance becomes insufficient.

For this reason, many studies have been so far made about improvement of polybutadiene rubbers. For example, there have been proposed a method using a polybutadiene rubber having a wide molecular weight distribution to improve tackiness and green strength (Japanese Laid-open Patent Application (Kokai) No. 45337/1984) and a method using a polybutadiene rubber having a high molecular weight to improve wear resistance. Nevertheless, these methods have a problem that wear resistance is improved but processability is decreased.

A rubber composition containing a polybutadiene rubber having a high trans content has been proposed (Japanese Laid-open Patent Application (Kokai) No. 197749/1985). On this occasion, a polybutadiene rubber having a high trans content is used chiefly to improve processability and cold flow property of the rubber composition, and there is almost no effect of improvement in wear resistance.

Polybutadienes having a trans content of higher than 90% have been studied in Japanese Laid-open Patent Application (Kokai) Nos. 163951/1986, 168636/1986, 168637/1986 and 168639/1986. However, they are all concerned with resin materials, not with rubber compositions.

Next, upon looking at the situation of automobile tires, polybutadiene rubbers having a low vinyl content or styrene-butadiene copolymer rubbers having a low styrene content or a low vinyl content have been hitherto used to improve wear resistance. Nevertheless, the rubber compositions containing these rubbers as a main component have suffered a defect that wet skid resistance, a property required of tire treads, is decreased.

When a rubber composition containing as a main component a polybutadiene rubber having a high vinyl content or a styrene-butadiene copolymer rubber having a high styrene content is used to improve wet skid resistance, wear resistance is decreased; especially in case of a styrene-butadiene copolymer rubber having a high styrene content, rebound resilience is decreased and rolling resistance of a tire is increased.

The present inventors have found before that rebound resilience is remarkably improved by reacting a diene copolymer having active alkali metal and/or alkaline earth metal ends with a compound having in a molecule an atomic group of the formula —C(=M)—N< (wherein M denotes an oxygen atom or a sulfur atom) to introduce the specific atomic group into the polymer (U.S. Pat. No. 4,647,625). The diene rubber polymer with the atomic group introduced is improved in not only rebound resilience but also wear resistance and wet skid resistance. However, in relation to environmental problems in recent years, low fuel consumption has been increasingly demanded, and levels of improvements in light weight and wear resistance of tires have become quite high accordingly. Nonetheless, the conventional methods can hardly meet such high levels.

A rubber composition containing a butadiene rubber having a high trans content of a butadiene moiety or a styrene-butadiene copolymer rubber has been proposed (Japanese Laid-open Patent Application (Kokai) No. 100146/1982). This proposal aims chiefly to improve processability or cold flow property or to improve decrease in wet skid resistance provided by using the styrene-butadiene copolymer rubber, and it has actually little effect of improvement in wear resistance.

SUMMARY OF THE INVENTION

It is an object of this invention to provide a process for producing a diene polymer which has excellent tensile strength and markedly improved wear resistance as well as improved heat build-up, rebound resilience, processability and wet skid resistance.

Another object of this invention is to provide a rubber composition containing such a diene polymer.

DETAILED DESCRIPTION OF THE INVENTION

The present inventors have made extensive investigations for solving the problems associated with the prior art, and as a result, have found that a diene polymer having excellent properties is produced by reacting active ends of a diene polymer formed in the presence of a composite catalyst containing an alkaline earth metal with carbon dioxide and/or carbon disulfide, or reacting part of the active ends with these compounds and further reacting the remaining active ends with a compound having a specific atomic group.

They have moreover found that a rubber composition especially suitable as a tire rubber material is produced by containing in a starting rubber not less than 10% by weight of (A) a modified diene polymer obtained by reacting active ends of an active diene polymer having a high content of a trans-1,4 bond with carbon dioxide and/or carbon disulfide or of both the modified diene polymer (A) and (B) a modified diene polymer obtained by reacting the active ends of the active diene polymer with a compound having a specific atomic group.

This invention has been completed on the basis of these findings.

Thus, according to this invention, there are provided a process for producing a diene polymer and a rubber composition containing a modified diene polymer, as described in the following (1), (2), (3) and (4).

(1) A process for producing a diene polymer, which comprises polymerizing a conjugated diene monomer or a mixture of the conjugated diene monomer and an aromatic vinyl monomer in a hydrocarbon solvent using a composite initiator containing an alkaline earth metal, and reacting active ends of the obtained active diene polymer with (a) at least one compound selected from compounds represented by the formula M=C=M (wherein M denotes an oxygen atom or a sulfur atom).

(2) A process for producing a diene polymer, which comprises polymerizing a conjugated diene monomer or a mixture of the conjugated diene monomer and an aromatic vinyl monomer in a hydrocarbon solvent using a composite initiator containing an alkaline earth metal, reacting 5 to 95% of all active ends of the obtained active diene polymer with (a) at least one compound o selected from compounds represented by the formula M=C=M (wherein M denotes an oxygen atom or a sulfur atom), and reacting 95 to 5% of all active ends of the obtained active diene polymer with N-substituted aminoketone, N-substituted thioaminoketone, N-substituted aminoaldehyde, N-substituted thioaminoaldehyde or a compound having in a molecule an atomic group represented by the formula —C(=M)—N< (wherein M denotes an oxygen atom or a sulfur atom).

(3) A rubber composition characterized in that not less than 10% by weight of a modified diene polymer formed by reacting active ends of an active diene polymer resulting from polymerization of a conjugated diene monomer or a mixture of the conjugated diene monomer and an aromatic vinyl monomer and containing not less than 75% by weight of a trans-1,4 bond of a conjugated diene moiety with (a) at least one compound selected from compounds represented by the formula M=C=M (wherein M denotes an oxygen atom or a sulfur atom) is contained in a component rubber.

(4) A rubber composition characterized in that not less than 10% by weight of a modified diene polymer comprising 5 to 95% by weight of (A) a modified polymer formed by reacting active ends of an active diene polymer resulting from polymerization of a conjugated diene monomer or a mixture of the conjugated diene monomer and an aromatic vinyl monomer and containing not less than 75% by weight of a trans-1,4 bond of a conjugated diene moiety with (a) at least one compound selected from compounds represented by the formula M=C=M (wherein M denotes an oxygen atom or a sulfur atom), and 95 to 5% by weight of (B) a modified diene polymer formed by reacting active ends of the active diene polymer with N-substituted aminoketone, N-substituted thioaminoketone, N-substituted aminoaldehyde, N-substituted thioaminoaldehyde or a compound having in a molecule an atomic group represented by the formula —C(=M)—N< (wherein M denotes an oxygen atom or a sulfur atom) is contained in a component rubber.

This invention will be described in more detail below.

Monomers

Examples of the conjugated diene monomer used in this invention are 1,3-butadiene, isoprene, 1,3-pentadiene, 2,3-dimethyl-1,3-butadiene, 1,3-hexadiene and mixtures thereof.

Examples of the aromatic vinyl monomer are styrene, alpha-methylstyrene, p-methylstyrene, vinyltoluene, vinylnaphthalene and mixtures thereof.

When the conjugated diene monomer and the aromatic vinyl monomer are conjointly used, the aromatic vinyl monomer is used in an amount of not more than 50% by weight. The conjugated diene monomer/aromatic vinyl monomer weight ratio is preferably 95:5 to 50:50, more preferably 95:5 to 80:20. When the amount of the aromatic vinyl monomer exceeds 50% by weight, the effect of improvement in wear resistance is decreased.

Composite initiator, et al.

Examples of the composite catalyst containing the alkaline earth metal, used in this invention, are composite catalysts containing compounds of barium, strontium, calcium, etc. as a main component, which are disclosed in U.S. Pat. Nos. 3,946,385, 3,992,561, 4,079,176, 4,092,268, 4,112,210, 4,129,705, 4,260,519 and 4,297,240. They are, however, not critical.

The use of these composite catalysts can give a polymer having a quite high content of a trans-1,4 bond of a conjugated diene moiety.

The amount of the composite catalyst containing the alkaline earth metal is usually 0.2 to 20 mmols per 100 g in total of the monomer components.

Along with the composite catalyst, a polar compound such as an ether compound, an amine compound, a phosphine compound or a metal alcoholate can properly be used for controlling randomization of the aromatic vinyl monomer of the polymer.

Hydrocarbon solvent, etc.

The hydrocarbon solvent used in this invention is selected from aliphatic hydrocarbons, aromatic hydrocarbons and alicyclic hydrocarbons. Examples of the hydrocarbon solvent are propane, n-butane, i-butane, n-pentane, i-pentane, n-hexane, cyclohexane, 1-butene, i-butene, trans-2-butene, cis-2-butene, 1-pentene, 2-pentene, 1-hexene, 2-hexene, benzene, toluene, xylene, ethylbenzene and mixtures thereof.

The monomer: hydrocarbon solvent ratio can properly be determined depending on viscosity of a reaction solution, stirring force and ability to remove heat in a polymerization vessel, etc. Said ratio is usually 1:10 to 1:1.

The polymerization temperature is −20° C. to 150° C., preferably 40° to 120° C. The polymerization reaction can be performed either with temperature rise or at a fixed temperature.

Diene polymer

When the conjugated diene monomer or the mixture of the conjugated diene monomer and the aromatic vinyl monomer is polymerized in the hydrocarbon solvent using the composite catalyst containing the alkaline earth metal, the diene polymer having active ends is obtained. The active ends are reacted with the specific compound to afford the modified diene polymer.

When the polymerization is performed using the composite catalyst containing the alkaline earth metal, the diene polymer having the high content of the trans-1,4 bond of the conjugated diene moiety is provided. It is desirous that the content of the trans-1,4 bond is not less than 75% by weight. Especially, when the diene polymer is used as a tire rubber material of a tread, less than 75% by weight of the trans-1,4 bond of the conjugated diene moiety makes tensile strength and wear resistance insufficient. It is preferably not less than 80% by weight, more preferably not less than 85% by weight.

Moreover, it is advisable that the diene polymer has a weight-average molecular weight of not less than 200,000 found by calculating data obtained through GPC (gel permeation chromatography) with standard polystyrene. When the molecular weight is too low, the effect of improvement in wear resistance is decreased. Preferably, it is 200,000 to 600,000. When it exceeds 600,000, processability is heavily decreased, and this is unwanted.

When the diene polymer is a copolymer, it may be a block copolymer; it is advisable that the aromatic vinyl monomers of the copolymer are randomly arranged along the molecular chain. For example, in case of a styrene-butadiene copolymer rubber, it is desirous that the copolymer is a random copolymer having a block styrene content, measured by an ozonolysis-GPC method of Tanaka, et al [Polymer Preprints, Japan, vol. 29, No. 9, 2055 (1980)], of not more than 10% by weight, preferably not more than 5% by weight, more preferably not more than 1% by weight. In particular, a copolymer in which a styrene block is present near a molecular chain end has at times inconvenient properties so that it becomes hard at a low temperature, and so on. When the styrene block is absent, a styrene chain distribution is not particularly limited.

Process for producing a modified diene polymer

In this invention, the modified diene polymer (A) is produced by polymerizing the conjugated diene monomer or the mixture of the conjugated diene monomer and the aromatic vinyl monomer in the hydrocarbon solvent using the composite catalyst containing the alkaline earth metal, and reacting the active ends of the obtained active diene polymer with (a) at least one compound selected from compounds represented by the formula M=C=M (wherein M denotes an oxygen atom or a sulfur atom).

Further, in this invention, the modified diene polymers (A) and (B) modified with the compound (a) and (b) at least one compound selected from N-substituted aminoketone, N-substituted thioaminoketone, N-substituted aminoaldehyde, N-substituted thioaminoaldehyde and a compound having in a molecule an atomic group represented by the formula —C(=M)—N< (wherein M denotes an oxygen atom or a sulfur atom) are produced by reacting part of the active ends of the active conjugated diene polymer with the compound (a), and reacting the remaining active ends with the compounds.

Still further, in the production of the rubber composition, it is also possible that the modified diene polymer (A) modified with the compound (a) and the modified diene polymer (B) modified with the compound (b) are separately produced and the rubber composition containing both of the polymers (A) and (B) is formed.

The compound (a) is carbon dioxide or carbon disulfide.

Examples of the compound (b) are compounds belonging to the group consisting of N-substituted aminoketones such as 4-dimethylaminobenzophenone, 4-diethylaminobenzophenone, 4-di-tert-butylaminobenzophenone, 4-diphenylbenzophenone, 4,4'-bis(dimethylamino)benzophenone, 4,4'-bis(diethylamino)benzophenone, 4,4'-bis(di-tert-butylamino)benzophenone, 4,4'-bis(diphenylamino)benzophenone, 4,4'-bis(divinylamino)benzophenone, 4-dimethylaminoacetophenone, 4-diethylaminoacetophenone, 1,3-bis(diphenylamino)-2-propane and 1,7-bis(methylethylamino)-4-heptanone, and their corresponding N-substituted aminothioketones. Further examples of the compound (b) are N-substituted aminoaldehydes such as 4-dimethylaminobenzaldehyde, 4-diphenylbenzaldehyde and 4-divinylbenzaldehyde, and their corresponding N-substituted aminothioaldehydes. Still further examples of the compound (b) are compounds having an atomic group in a molecule represented by the formula —C(=M)—N< (wherein M denotes an oxygen atom or a sulfur atom). Concrete examples thereof are N-substituted lactams such as N-methyl-beta-propiolactam, N-tert-butyl-beta-propiolactam, N-phenyl-betapropiolactam, N-methoxydiphenyl-beta-propiolactam, N-naphthyl-beta-propiolactam, N-methyl-2-pyrrolidone, N-tert-butyl-2-pyrrolidone, N-phenyl-2-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-tert-butyl-5-methyl-2-pyrrolidone, N-phenyl-5-methyl-2-pyrrolidone, N-methyl-3,3'-dimethyl-2-pyrrolidone, N-tert-butyl-3,3'-dimethyl-2-pyrrolidone, N-phenyl-3,3'-dimethyl-2-pyrrolidone, N-methyl-2-piperidone, N-tert-butyl-2-piperidone, N-phenyl-2-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-phenyl-3,3'-dimethyl-2-piperidone, N-methyl-epsiloncaprolactam, N-phenyl-epsilon-caprolactam, N-methoxy-phenyl-epsilon-caprolactam, N-vinyl-epsilon-caprolactam, N-benzyl-epsilon-caprolactam, N-naphthyl-epsilon-caprolactam, N-methyl-omega-laurylolactam, N-phenyl-omegalaurylolactam, N-tert-butyl-omega-laurylolactam, N-vinyl-omega-laurylolactam and N-benzyl-omegalaurylolactam, and their corresponding N-substituted thiolactams; and N-substituted ethylene ureas such as 1,3-diemthylethylene urea, 1,3-diphenylethylene urea, 1,3-di-tert-butylethylene urea and 1,3-divinylethylene urea, and their corresponding N-substituted thioethylene ureas.

When the active diene polymer is reacted with the compound (a) represented by the formula M=C=M, the amount of the compound (a) is determined such that 5 to 100%, preferably 10 to 95%, more preferably 10 to 50% of all active ends of the active diene polymer are reacted with the compound (a) to modify them. When all of the active ends are unmodified, the mixture of the diene polymer (A) modified with the compound (a) and the unmodified diene polymer is obtained.

The diene polymer resulting from polymerization of the conjugated diene monomer or the mixture of the conjugated diene monomer and the aromatic vinyl monomer using the composite catalyst containing the alkaline earth metal is reacted with the compound (a) to provide a modified diene polymer having improved tensile strength, wear resistance, rebound resilience, heat build-up, wet skid resistance and processability.

In case of using both the compounds (a) and (b), 5 to 95%, preferably 5 to 50% of all the active ends of the active diene polymer are reacted with the compound (a), and 95 to 5%, preferably 95 to 50% of the remaining active ends are reacted with the compound (b). All (100%) of the active ends of the active diene polymer are not necessarily modified with the compounds (a) and (b), and the unmodified diene polymer may remain. On that occasion, a mixture (rubber composition) containing not less than 5% by weight of the diene polymer modified with the compound (a), not less than 5% by weight of the diene polymer modified with the compound (b) and the unmodified diene polymer is obtained.

Modification with both the compounds (a) and (b) can further improve tensile strength, wear resistance, rebound resilience, heat build-up and processability.

Especially, properties can be greatly improved by using an active diene polymer having not less than 75 by weight of a trans-1,4 bond.

When the compound (a) is used alone, its amount is usually 0.05 to 1 mol, preferably 0.05 to 0.95 mol, more preferably 0.05 to 0.50 mol per mol of the polymerization catalyst used. When both the compounds (a) and (b) are used, the amount of each of them is 0.05 to 0.95 mol. Preferably, the amount of the compound (a) is 0.05 to 0.50 mol, and the amount of the compound (b) is 0.95 to 0.50 mol. Each reaction proceeds usually at room temperature to 100° C. for several seconds to several minutes. After the reaction is over, the diene polymer containing the end modified diene polymers (A) and (B) is recovered from the reaction solution by steam stripping.

When the polymer is modified with the compounds (a) and (b) in sequence, the modification is conducted first with the compound (a) and then with the compound (b), or first with the compound (b) and then with the compound (a).

Rubber Composition

The rubber composition of this invention is a rubber composition containing not less than 10% by weight of the modified diene polymer (A) formed by reacting the active ends of the active diene polymer resulting from polymerization of the conjugated diene monomer or the mixture of the conjugated diene monomer and the aromatic vinyl monomer and containing not less than 75% by weight of the trans-1,4 bond of the conjugated diene moiety with the compound (a) or both the modified diene polymer (A) and modified diene polymer (B) obtained by reacting the active ends of the said active diene polymer with the compound (b).

The diene polymer containing not less than 75% by weight of the trans-1,4 bond of the conjugated diene moiety can be obtained by polymerizing the conjugated diene monomer or the mixture of the conjugated diene monomer and the aromatic vinyl monomer in the hydrocarbon solvent using the composite catalyst containing the alkaline earth metal. When the content of the trans-1,4 bond is less than 75% by weight, tensile strength, wear resistance, etc. are less improved. It is preferably not less than 85% by weight.

Especially, a rubber composition containing not less than 10% by weight, preferably not less than 20% by weight in total of the modified diene polymer (A) (5 to 95% by weight, preferably 5 to 50% by weight) and the modified diene polymer (B) (95 to 5% by weight, preferably 95 to 50% by weight) is desirous because it improves greatly tensile strength, wear strength, rebound resilience, heat build-up, wet skid resistance and processability. When the modified diene polymer (A) and the modified diene polymer (B) are conjointly used, the polymers (A) and (B) may be prepared either separately or by reacting the active ends of the active diene polymer with the compounds (a) and (b) in sequence. In this invention, the weight ratio of the modified diene polymers is a value calculated on the basis of mol% of the composite catalyst and mol% of the compound (a) or (b) on the assumption that the reaction is performed stoichiometrically.

When the amount of the modified diene polymer (A) or the mixture of the modified diene polymers (A) and (B) is less than 10% by weight, tensile strength, wear resistance and rebound resilience are less improved. Said amount is preferably not less than 20% by weight.

As the rubber component other than the unmodified diene polymer contained in the starting rubber, various ordinary rubbers are available, and it is not particularly limited. Examples of the other rubber component are a natural rubber, a polyisoprene rubber, a polybutadiene rubber having a high cis content, a styrene-butadiene copolymer rubber (prepared by emulsion polymerization or solution polymerization and having a low to high vinyl content), an isoprene-butadiene copolymer rubber, a polybutadiene rubber having a high vinyl content, a polybutadiene rubber having a low cis content, an acrylonitrile-butadiene copolymer rubber, an acrylic rubber, an epichlorohydrin rubber, a hydrogenated acrylonitrile-butadiene copolymer rubber, a fluororubber, a polynorbornene rubber, and an ethylene-propylene copolymer rubber.

The rubber composition of this invention is produced by mixing the rubber component containing the modified diene polymer(s) and various additives by a mixer such as a roll mixer or a Banbury mixer. The additives are not particularly limited and may be selected from the group of those ordinarily used in the rubber industry depending on the use purpose of the rubber composition. Usually, as a vulcanization system, sulfur, stearic acid, zinc oxide, various vulcanization accelerators (thiazole-type, thiuram-type and sulfenamide-type), and organic peroxides are available; as a reinforcing agent, carbon blacks of various grades such as HAF and ISAF, and silica are available; as a filler, calcium carbonate and talc are available; and other additives are a process oil, a processing aid, a vulcanization retarder and an antioxidant. These additives are selected depending on the use purpose of the rubber composition, and are not particularly limited in this invention.

In accordance with this invention, there can be obtained a diene polymer or a rubber composition having improved tensile strength, wear resistance, heat build-up and processability as well as improved balance of rebound resilience and wet skid resistance. The diene polymer and the rubber composition of this invention are suited particularly for use in a tread portion, a side wall portion and a carcass portion of a tire, a hose, a packing, a vibration-damping rubber, a coated cloth, a sole of a shoe, etc.

The following Examples and Comparative Examples illustrate this invention more specifically. Incidentally, parts and percentages in Examples and Comparative Examples are all by weight unless otherwise indicated.

Tensile Strength

Tensile strength was measured according to JIS K-6301. The unit is kg/cm².

Wear Resistance

Wear resistance was measured according to ASTM D-2228 using a Pico wear tester, and calculated in terms of an index.

Wet Skid Resistance

Wet skid resistance was measured at 23° C. with a portable skid tester on a road surface indicated in ASTM E-303-74, and calculated in terms of an index.

Rebound Resilience

Rebound resilience was measured with a Rüpke rebound tester rebound resilience measuring device, and calculated in terms of an index.

Heat Build-up

An amount of heat was measured with a Goodrich flexometer at 100° C. and 1800 rpm with a load of 25 lb., and calculated in terms of an index.

Processability

Workability in roll kneading of a rubber composition was measured with the following three grades.
○: Winding property is good.
Δ: At the initial stage, the rubber composition is wound but bagging occurs on the way.
X: The rubber composition is not wound around a roll and rises up.

EXAMPLE 1

Production Example 1 of a diene polymer

A 15-liter stainless steel autoclave-type polymerization reactor was washed, dried and purged with dry nitrogen. Then, 7,000 g of cyclohexane was charged therein, and 1,3-butadiene and styrene (or isoprene=IP) were then charged in amounts shown in Tables 1 and 2. Further, a dibutylmagnesium/triethylaluminum complex (a Mg/Al molar ratio=5.0) and tert-butoxybarium were added in amounts shown in Tables 1 and 2 (provided the amount of the dibutylmagnesium/triethylaluminum complex was calculated as magnesium). While the contents in the polymerization reactor were stirred, polymerization was performed at 60° C. for 5 hours.

After the polymerization reaction was over, a compound (b) shown in Tables 1 and 2 was added in an amount shown in Tables 1 and 2, and the addition reaction was conducted for 30 minutes. Subsequently, the compound (a) shown in Tables 1 and 2 was added in an amount shown in Tables 1 and 2, and the addition reaction was conducted for 30 minutes. Thereafter, methanol was added to the polymerization reactor to stop the reaction. Eight grams of BHT (2,6-di-tert-butyl-p-cresol) were added, and the solvent was then removed by steam stripping. The resulting polymer was dried under reduced pressure at 60° C. for 24 hours.

The content of the trans-1,4 of the thus obtained polymer was found by Morrero method using an infrared spectrometer. The styrene content was calculated by NMR. The results are shown in Tables 1 and 2 together with Mooney viscosity ($ML_{1+4}$; 100° C.). By the way, the abbreviations of the compound (b) in Tables are EAB: 4,4'-bis(diethylamino)benzophenone
DMI: dimethylimidazoline
NMC: N-methyl-epsilon-caprolactam
NMP: N-methyl-2-pyrrolidone
NPP: N-phenyl-2-pyrrolidone
NVP: N-vinyl-2-pyrrolidone

TABLE 1

| Diene polymer | Amount in polymerization | | | | Compound (b) | | | Compound (a) | | | an unmodified product (%) | Properties resulting polymer | | |
|---|---|---|---|---|---|---|---|---|---|---|---|---|---|---|
| | Styrene (g) | Butadiene (g) | Mg/Al (mol) | Ba (mmol) | Type | Amount (mol) | Rate of modification (%) | Type | Amount (mol) | Rate of modification (%) | | Styrene (%) | Trans (%) | $ML_{1+4}$ |
| A | 0 | 1000 | 0.018 | 2.5 | — | 0 | 0 | $CO_2$ | 0.005 | 95 | 5 | 0 | 92.2 | 48.1 |
| B | 0 | 1000 | 0.018 | 2.4 | — | 0 | 0 | $CS_2$ | 0.005 | 95 | 5 | 0 | 92.2 | 46.9 |
| C | 0 | 1000 | 0.015 | 2.4 | NMP | 0.004 | 80 | $CO_2$ | 0.001 | 20 | 0 | 0 | 88.3 | 37.6 |
| D | 0 | 1000 | 0.019 | 2.5 | NPP | 0.003 | 60 | $CO_2$ | 0.002 | 40 | 0 | 0 | 91.7 | 39.7 |
| E | 0 | 1000 | 0.020 | 2.6 | DMI | 0.001 | 20 | $CS_2$ | 0.004 | 80 | 0 | 0 | 92.7 | 46.8 |
| F | 120 | 880 | 0.018 | 2.4 | — | 0 | 0 | $CO_2$ | 0.005 | 95 | 5 | 12.2 | 92.4 | 44.3 |
| G | 120 | 880 | 0.017 | 2.4 | NMC | 0.004 | 80 | $CS_2$ | 0.001 | 20 | 0 | 12.5 | 92.3 | 35.0 |
| H | 120 | 880 | 0.018 | 2.4 | NVP | 0.001 | 20 | $CS_2$ | 0.004 | 80 | 0 | 12.6 | 92.0 | 46.3 |
| I | 120 | 880 | 0.015 | 2.5 | NMC | 0.004 | 80 | $CO_2$ | 0.001 | 20 | 0 | 12.1 | 85.8 | 47.6 |
| J | IP = 120 | 880 | 0.014 | 2.5 | EAB | 0.004 | 80 | $CO_2$ | 0.001 | 20 | 0 | IP = 12.1 | 84.6 | 40.6 |
| K | 0 | 1000 | 0.020 | 2.6 | — | 0 | 0 | — | 0 | 0 | 100 | 0 | 92.5 | 38.6 |
| L | 120 | 880 | 0.018 | 2.4 | — | 0 | 0 | — | 0 | 0 | 100 | 12.6 | 92.4 | 43.9 |

TABLE 2

| Diene polymer | Amount in polymerization | | | | Compound (b) | | | Compound (a) | | | an unmodified product (%) | Properties resulting polymer | | |
|---|---|---|---|---|---|---|---|---|---|---|---|---|---|---|
| | Styrene (g) | Butadiene (g) | Mg/Al (mol) | Ba (mmol) | Type | Amount (mol) | Rate of modification (%) | Type | Amount (mol) | Rate of modification (%) | | Styrene (%) | Trans (%) | $ML_{1+4}$ |
| M | 0 | 1000 | 0.018 | 2.5 | NMP | 0.004 | 80 | $CO_2$ | 0.001 | 20 | 0 | 0 | 92.7 | 39.4 |
| N | 0 | 1000 | 0.012 | 2.4 | NVP | 0.004 | 80 | $CO_2$ | 0.001 | 20 | 0 | 0 | 81.3 | 43.9 |
| O | 0 | 1000 | 0.010 | 2.4 | NMC | 0.003 | 60 | $CS_2$ | 0.002 | 40 | 0 | 0 | 77.4 | 46.8 |
| P | 0 | 1000 | 0.008 | 2.5 | EAB | 0.003 | 60 | $CO_2$ | 0.002 | 40 | 0 | 0 | 72.1 | 49.4 |
| Q | 0 | 1000 | 0.020 | 2.5 | NPP | 0.0025 | 50 | $CS_2$ | 0.0025 | 50 | 0 | 0 | 92.7 | 44.2 |

TABLE 2-continued

| Diene polymer | Amount in polymerization | | | | Compound (b) | | Rate of modification (%) | Compound (a) | | Rate of modification (%) | an unmodified product (%) | Properties resulting polymer | | |
|---|---|---|---|---|---|---|---|---|---|---|---|---|---|---|
| | Styrene (g) | Butadiene (g) | Mg/Al (mol) | Ba (mmol) | Type | Amount (mol) | | Type | Amount (mol) | | | Styrene (%) | Trans (%) | $ML_{1+4}$ |
| R | 0 | 1000 | 0.019 | 2.5 | NMP | 0.0015 | 30 | $CO_2$ | 0.0035 | 70 | 0 | 0 | 91.8 | 42.9 |
| S | 50 | 950 | 0.018 | 2.4 | NMC | 0.004 | 80 | $CO_2$ | 0.001 | 20 | 0 | 5.1 | 92.7 | 37.4 |
| U | 180 | 820 | 0.019 | 2.5 | NPP | 0.0035 | 70 | $CS_2$ | 0.0015 | 30 | 0 | 17.7 | 92.1 | 37.0 |
| V | 230 | 770 | 0.020 | 2.5 | NVP | 0.004 | 80 | $CO_2$ | 0.001 | 20 | 0 | 23.1 | 91.5 | 44.3 |
| W | 120 | 880 | 0.012 | 2.5 | DMI | 0.0035 | 70 | $CS_2$ | 0.0015 | 30 | 0 | 12.7 | 80.2 | 44.9 |
| X | 120 | 880 | 0.009 | 2.5 | MMP | 0.004 | 80 | $CS_2$ | 0.001 | 20 | 0 | 12.5 | 71.6 | 47.7 |
| Y | 0 | 1000 | 0.008 | 2.5 | — | 0 | 0 | $CO_2$ | 0.005 | 95 | 5 | 0 | 72.1 | 49.7 |
| Z | 120 | 880 | 0.009 | 2.5 | — | 0 | 0 | $CO_2$ | 0.005 | 95 | 5 | 12.5 | 71.6 | 48.0 |

EXAMPLE 2

Using the diene polymer modified with the compound (a) [$CO_2$ or $CS_2$], which was obtained in Example 1, a rubber composition was prepared according to a formulation shown in Table 3.

The rubber compositions were prepared by mixing the components via a 250 milliliter Brabender-type mixer. Test pieces were formed by press-vulcanizing said rubber compositions at 160° C. for 20 minutes, and properties of the vulcanizates were measured. The results are shown in Table 4.

TABLE 3

| | |
|---|---|
| Polymer | 100 parts |
| Zinc oxide | 3 |
| Sulfur | 1.5 |
| Stearic acid | 2 |
| Carbon black | 50 |
| Aromatic process oil | 5 |
| N-oxydiethylene-2-benzothiazylsulfeneamide | 1.1 |

TABLE 4

| Run No. | Example 4-1 | Example 4-2 | Comparative Example 4-3 | Comparative Example 4-4 | Example 4-5 | Comparative Example 4-6 | Comparative Example 4-7 |
|---|---|---|---|---|---|---|---|
| Diene polymer | A | B | K | Y | F | L | Z |
| Trans (%) | 92.2 | 92.9 | 92.5 | 70 | 92.4 | 92.4 | 70 |
| Rate of $CO_2$ modification (%) | 95 | 0 | 0 | 95 | 95 | 0 | 95 |
| Rate of $CS_2$ modification (%) | 0 | 95 | 0 | 0 | 0 | 0 | 0 |
| Tensile strength | 235 | 242 | 162 | 145 | 316 | 270 | 263 |
| Wear resistance | 124 | 126 | 100 | 82 | 125 | 100 | 89 |
| Wet skid resistance | 101 | 101 | 100 | 100 | 101 | 100 | 100 |
| Rebound resilience | 110 | 112 | 100 | 90 | 109 | 100 | 95 |
| Heat build-up | 150 | 148 | 100 | 88 | 156 | 100 | 90 |
| Processability | X | X | X | ∘ | ∘ | ∘ | ∘ |

As shown in Table 4, the diene polymers or the rubber compositions containing the modified diene polymers in this invention are improved in tensile strength, wear resistance and heat build-up as well as in balance of wet skid resistance and rebound resilience compared to the rubber materials in Comparative Examples.

EXAMPLE 3

Using the diene polymers modified with the compound (a) [$CO_2$ or $CS_2$] and the compound (b), which were obtained in Example 1, the rubber compositions were prepared as in Example 2, and processability and properties of the vulcanizates were evaluated. The results are shown in Tables 5 and 6.

TABLE 5

| Run No. | Example 5-1 | Example 5-2 | Example 5-3 | C. Ex 5-4 | Example 5-5 | Example 5-6 | Example 5-7 | C. Ex 5-8 | Example 5-9 | Example 5-10 |
|---|---|---|---|---|---|---|---|---|---|---|
| Diene polymer | M | N | O | P | C | Q | R | K | D | E |
| Trans (%) | 92.7 | 81.3 | 77.4 | 72.1 | 88.3 | 92.7 | 91.8 | 92.5 | 91.7 | 92.7 |
| Rate of $CO_2$ modification (%) | 20 | 20 | 40 | 40 | 20 | 0 | 70 | 0 | 40 | 0 |
| Rate of $CS_2$ modification (%) | 0 | 0 | 0 | 0 | 0 | 50 | 0 | 0 | 0 | 80 |
| Modifier Type | NMP | NVP | NMC | EAB | NMC | NPP | NMP | — | NPP | DMI |
| Rate of modification (%) | 80 | 80 | 60 | 60 | 80 | 50 | 30 | 0 | 60 | 20 |
| Tensile strength | 266 | 231 | 205 | 172 | 254 | 256 | 248 | 162 | 242 | 246 |
| Wear resistance | 143 | 114 | 104 | 89 | 133 | 130 | 17 | 100 | 130 | 128 |
| Wet skid resistance | 101 | 98 | 95 | 85 | 100 | 101 | 100 | 100 | 100 | 101 |
| Rebound resilience | 122 | 108 | 105 | 92 | 118 | 119 | 115 | 100 | 122 | 117 |
| Heat build-up | 126 | 114 | 137 | 97 | 119 | 141 | 145 | 100 | 135 | 141 |
| Processability | Δ | ∘ | ∘ | ∘ | ∘ | X | X | X | X | X |

C. Ex: Comparative Example

TABLE 6

| Run No. | Example 6-1 | C. Ex 6-2 | Example 6-3 | Example 6-4 | Example 6-5 | Example 6-6 | Example 6-7 | C. Ex 6-8 | Example 6-9 |
|---|---|---|---|---|---|---|---|---|---|
| Diene polymer | G | X | I | V | W | U | H | L | S |
| Trans (%) | 92.3 | 71.6 | 85.8 | 91.5 | 80.2 | 92.1 | 92.0 | 92.4 | 92.7 |
| Rate of $CO_2$ modification (%) | 0 | 0 | 20 | 20 | 0 | 0 | 0 | 0 | 20 |
| Rate of $CS_2$ modification (%) | 20 | 20 | 0 | 0 | 30 | 30 | 80 | 0 | 0 |
| Modifier Type | NMC | NMP | NMC | NVP | DMI | NPP | NVP | — | NMC |
| Rate of modification (%) | 80 | 80 | 80 | 80 | 70 | 70 | 20 | 0 | 80 |
| Tensile strength | 314 | 239 | 265 | 321 | 251 | 323 | 315 | 270 | 295 |
| Wear resistance | 138 | 81 | 121 | 109 | 103 | 123 | 130 | 100 | 145 |
| Wet skid resistance | 100 | 90 | 98 | 107 | 97 | 103 | 101 | 100 | 97 |
| Rebound resilience | 130 | 94 | 122 | 120 | 106 | 130 | 113 | 100 | 138 |
| Heat build-up | 121 | 92 | 118 | 129 | 110 | 125 | 145 | 100 | 127 |
| Processability | ○ | ○ | ○ | ○ | ○ | ○ | ○ | ○ | ○ |

C. Ex: Comparative Example

As shown in Tables 5 and 6, the diene polymers or the rubber compositions containing the modified diene polymers in this invention are improved in tensile strength, wear resistance and heat build-up as well as in balance of wet skid resistance and rebound resilience compared to the rubber materials in Comparative Examples. Especially, wear resistance is markedly improved.

EXAMPLE 4

Using a blend of the diene polymer modified lo With only the compound (a) [$CO_2$ or $CS_2$] or the diene polymers modified with the compounds (a) and (b), which were obtained in Example 1, and a natural rubber, a rubber composition was prepared as in Example 2, and processability and properties of the vulcanizates were likewise evaluated. The results are shown in Tables 7 and 8.

TABLE 7

| Run No. | | Example 7-1 | Example 7-2 | C. Ex 7-3 | Example 7-4 | C. Ex 7-5 | C. Ex 7-6 |
|---|---|---|---|---|---|---|---|
| Diene polymer | No. | A | B | K | F | L | — |
| | Amount (parts by weight) | 80 | 80 | 80 | 80 | 80 | — |
| Natural | Amount (parts by weight) | 20 | 20 | 20 | 20 | 20 | 100 |
| Tensile strength | | 244 | 2250 | 189 | 316 | 270 | 296 |
| Wear resistance | | 124 | 126 | 100 | 164 | 117 | 100 |
| Wet skid resistance | | 99 | 101 | 100 | 97 | 96 | 100 |
| Rebound resilience | | 110 | 112 | 100 | 102 | 92 | 100 |
| Heat build-up | | 150 | 148 | 100 | 102 | 98 | 100 |
| Processability | | ○ | ○ | ○ | ○ | ○ | ○ |

C. Ex: Comparative Example

TABLE 8

| Run No. | Example 8-1 | Example 8-2 | Example 8-3 | Example 8-4 | C. Ex 8-5 | C. Ex 8-6 | Example 8-7 | Example 8-8 | Example 8-9 | Example 8-10 | C. Ex 8-11 |
|---|---|---|---|---|---|---|---|---|---|---|---|
| Diene polymer M | 100 | | | | | | 50 | | | | |
| Diene polymer C | | 100 | | | | | | 50 | | | |
| Diene polymer N | | | 100 | | | | | | 50 | | |
| Diene polymer O | | | | 100 | | | | | | 50 | |
| Diene polymer P | | | | | 100 | | | | | | 50 |
| NR (RSS #3) | | | | | | 100 | 50 | 50 | 50 | 50 | 50 |
| Tensile strength | 266 | 254 | 231 | 205 | 172 | 296 | 287 | 273 | 252 | 234 | 203 |
| Wear resistance | 314 | 297 | 273 | 259 | 151 | 100 | 248 | 222 | 190 | 171 | 116 |
| Wet skid resistance | 91 | 88 | 88 | 86 | 78 | 100 | 97 | 95 | 96 | 92 | 90 |
| rebound resilience | 108 | 106 | 105 | 104 | 92 | 100 | 103 | 102 | 102 | 101 | 93 |
| Heat build-up | 102 | 102 | 102 | 101 | 90 | 100 | 101 | 100 | 100 | 100 | 99 |
| Processability | Δ | ○ | ○ | ○ | ○ | ○ | ○ | ○ | ○ | ○ | ○ |

C. Ex: Comparative Example

EXAMPLE 5

Using a blend of the diene polymer modified with only the compound (a) [$CO_2$ or $CS_2$] or the diene polymers modified with the compounds (a) and (b), which were prepared in Example 1, and a diene rubber, a rubber composition was prepared as in Example 2, and processability and properties of the vulcanizates were likewise evaluated. The results are shown in Tables 9 and 10.

TABLE 9

| Run No. | Example 9-1 | Example 9-2 | Comparative Example 9-3 | Comparative Example 9-4 | Comparative Example 9-5 | Comparative Example 9-6 | Example 9-7 | Example 9-8 | Example 9-9 | Example 9-10 | Comparative Example 9-11 | Comparative Example 9-12 |
|---|---|---|---|---|---|---|---|---|---|---|---|---|
| Diene polymer M | | | | | | | 50 | 50 | 50 | | | |
| Diene polymer O | | | | | | | | | | 50 | | |
| Diene polymer P | | | | | | | | | | | 50 | 50 |
| Diene polymer R | 100 | | | | | | | | | | | |
| Diene polymer E | | 100 | | | | | | | | | | |

TABLE 9-continued

| | | | | | | | | | | | | |
|---|---|---|---|---|---|---|---|---|---|---|---|---|
| Cis-BR(*1) | | 100 | | | | 50 | | | 50 | 50 | | |
| S-SBR(*2) | | | 100 | | | | 50 | | | | | 50 |
| E-SBR(*3) | | | | 100 | | | | 50 | | | | |
| NR(*4) | | | | | 100 | | | | | | | |
| Tensile strength | 248 | 246 | 204 | 226 | 301 | 296 | 235 | 243 | 279 | 205 | 189 | 201 |
| Wear resistance | 244 | 236 | 214 | 69 | 112 | 100 | 323 | 130 | 210 | 282 | 232 | 97 |
| Wet skid resistance | 91 | 89 | 68 | 122 | 110 | 100 | 82 | 107 | 101 | 81 | 73 | 99 |
| Rebound resilience | 104 | 103 | 103 | 95 | 86 | 100 | 104 | 102 | 100 | 99 | 89 | 85 |
| Heat build-up | 100 | 100 | 100 | 100 | 99 | 100 | 101 | 101 | 100 | 96 | 82 | 84 |
| Processability | Δ | Δ | ○ | Δ | ○ | ○ | ○ | ○ | ○ | ○ | ○ | ○ |

| | Example | | | | | | | |
|---|---|---|---|---|---|---|---|---|
| Run No. | 9-13 | 9-14 | 9-15 | 9-16 | 9-17 | 9-18 | 9-19 | 9-20 |
| Diene polymer M | | | | | | 35 | 35 | 35 |
| Diene polymer O | | | | | | | | |
| Diene polymer P | | | | | | | | |
| Diene polymer R | 50 | 50 | | | | | | |
| Diene polymer E | 50 | | 50 | 50 | 50 | | | |
| Cis-BR(*1) | | | 50 | | | 15 | | 50 |
| S-SBR(*2) | | | | | | | | 15 |
| E-SBR(*3) | | | | 50 | | | 15 | |
| NR(*4) | | 50 | | | 50 | 50 | 50 | |
| Tensile strength | 222 | 268 | 225 | 241 | 271 | 277 | 293 | 240 |
| Wear resistance | 234 | 190 | 230 | 183 | 177 | 197 | 176 | 234 |
| Wet skid resistance | 85 | 98 | 83 | 102 | 97 | 91 | 104 | 94 |
| Rebound resilience | 104 | 104 | 103 | 100 | 102 | 103 | 105 | 107 |
| Heat build-up | 100 | 100 | 100 | 100 | 100 | 100 | 100 | 100 |
| Processability | ○ | ○ | ○ | ○ | ○ | ○ | ○ | ○ |

C. Ex: Comparative Example

TABLE 10

| | C. Ex | Example | | | C. Ex | Example | | | | | | | |
|---|---|---|---|---|---|---|---|---|---|---|---|---|---|
| Run No. | 10-11 | 10-12 | 10-13 | 10-14 | 10-15 | 10-16 | 10-17 | 10-18 | 10-19 | 10-20 | 10-1 | 10-2 | 10-3 |
| Diene polymer S | | | | | | | | | | | 100 | | |
| Diene polymer T | | 80 | 80 | 80 | | 35 | 35 | 35 | 15 | 15 | | 100 | |
| Diene polymer U | | | | | | | | | | | | | 100 |
| Diene polymer X | 25 | | | | | | | | | | | | |
| NR (RSS #3) | 75 | | | | | 50 | 50 | 50 | | | | | |
| Cis-BR(*1) | | 20 | | | | | | 15 | | 35 | | | |
| E-SBR(*3) | | | 20 | | | | 15 | | 50 | 50 | | | |
| LI-BR(*5) | | | | 20 | 100 | 15 | | | 35 | | | | |
| Tensile strength | 286 | 295 | 310 | 291 | 190 | 290 | 306 | 291 | 259 | 263 | 295 | 314 | 323 |
| Wear resistance | 118 | 266 | 248 | 240 | 72 | 135 | 180 | 185 | 123 | 182 | 305 | 277 | 252 |
| Wet skid resistance | 100 | 101 | 110 | 111 | 119 | 110 | 106 | 95 | 114 | 95 | 96 | 105 | 108 |
| Rebound resilience | 96 | 103 | 101 | 103 | 97 | 108 | 103 | 105 | 97 | 100 | 111 | 103 | 103 |
| Heat build-up | 97 | 102 | 100 | 101 | 100 | 100 | 100 | 100 | 100 | 100 | 101 | 102 | 102 |
| Processability | ○ | ○ | ○ | ○ | ○ | ○ | ○ | ○ | ○ | ○ | ○ | ○ | ○ |

| | Comparative Example | | Example | | | | |
|---|---|---|---|---|---|---|---|
| Run No. | 10-4 | 10-5 | 10-6 | 10-7 | 10-8 | 10-9 | 10-10 |
| Diene polymer S | | | 25 | | | | |
| Diene polymer T | | | | 75 | 50 | 25 | |
| Diene polymer U | | | | | | | 25 |
| Diene polymer X | 100 | | | | | | |
| NR (RSS #3) | | 100 | 75 | 25 | 50 | 75 | 75 |
| Cis-BR(*1) | | | | | | | |
| E-SBR(*3) | | | | | | | |
| LI-BR(*5) | | | | | | | |
| Tensile strength | 239 | 301 | 299 | 312 | 308 | 306 | 305 |
| Wear resistance | 166 | 100 | 155 | 224 | 185 | 134 | 125 |
| Wet skid resistance | 95 | 100 | 100 | 103 | 102 | 101 | 103 |
| Rebound resilience | 77 | 100 | 103 | 103 | 102 | 101 | 101 |
| Heat build-up | 84 | 100 | 100 | 101 | 101 | 100 | 100 |
| Processability | ○ | ○ | ○ | ○ | ○ | | |

C. Ex: Comparative Example
(*1)Cis-BR: a Cis 1,4-bond content of 98% or more (NIPOL BR 1220: a trademark for a product of Nippon Zeon Co., Ltd.)
(*2)S-SBR: SBR obtained by solution polymerication used Li catalyst (a styrene content 13%, a 1,2-vinyl content 72%)
(*3)E-SBR: SBR obtained by emulsion polymerization used Li catalyst (NIPOL 150: a trademark for a product of Nippon Zeon Co., Ltd.)
(*4)NR: natural rubber (RSS #3)
(*5)Li-BR: BR obtained by solution polymerication used Li catalyst (a 1,2-vinyl content 76%)

EXAMPLE 6

Production Example 2 of a diene polymer

A 15-liter stainless steel autoclave-type polymerization reactor was washed, dried and purged with dry nitrogen. Then, 7,000 g of cyclohexane was charged therein, and 1,3-butadiene and styrene were then charged in amounts shown in Table 11. Further, a dibutylmagnesium/triethylaluminum complex (a Mg/Al molar ratio=5.0) and tert-butoxybarium were added in amounts shown in Table 11 (provided the amount of the dibutylmagnesium/triethylaluminum complex was calculated as magnesium). Immediately after the addition, 1,3-butadiene was added in an amount shown in Table 11 continuously for 3 hours. While stirring the contents in the polymerization reactor, polymerization was performed at 60° C. for 5 hours.

After the polymerization reaction was over, the compound (b) shown in Table 11 was added in an amount shown in Table 11, and the addition reaction was conducted for 30 minutes. Subsequently, methanol was added to the polymerization reactor to stop the reaction. Eight grams of BHT were added, and the solvent was then removed by steam stripping. The resulting polymer was dried under reduced pressure at 60° C. for 24 hours.

The content of the trans-1,4 bond and the styrene content of the thus obtained polymer were measured as in Example 1. The results are shown in Table 11 together with Mooney viscosity ($ML_{1+4}$, 100° C.) and a block styrene content.

A polymer mixture shown in Table 12 and various additives shown in Table 3 were mixed in amounts shown in Table 3 by means of a 250-milliliter Brabender-type mixer to obtain a rubber composition.

As shown in Table 12, the rubber compositions of this invention keep tensile strength at high level, and are improved in wear resistance as well as in balance of wet skid resistance and impact resilience. Especially, wear resistance is improved remarkably. Moreover, when a polymerization method is changed to more randomize a chain of styrene, the above balance is found to be more improved.

TABLE 11

| Diene polymer | Amount in polymerization | | | | Amount in post-addition | Compound (b) | | |
|---|---|---|---|---|---|---|---|---|
| | Styrene (g) | Butadiene (g) | Mg/Al (mol) | Ba (mmol) | Butadiene (g) | Type | Amount (mol) | Rate of modification (%) |
| m | 50 | 800 | 0.018 | 2.4 | 150 | NMC | 0.004 | 80 |
| n | 180 | 800 | 0.019 | 2.4 | 300 | NVP | 0.0035 | 70 |

| Diene polymer | Compound (a) | | | Properties of the resulting polymer | | | |
|---|---|---|---|---|---|---|---|
| | Type | Amount (mol) | Rate of modification (%) | Styrene (%) | Trans (%) | $ML_{1+4}$ | Block P-ST (%) |
| m | $CO_2$ | 0.001 | 20 | 5.3 | 92.4 | 38.7 | 0.1 |
| n | $CO_2$ | 0.0015 | 30 | 17.9 | 92.2 | 40.1 | 0.6 |

TABLE 12

| Run No. | Example | | | | | C. Ex |
|---|---|---|---|---|---|---|
| | 12-1 | 12-2 | 12-3 | 12-4 | 12-5 | 12-6 |
| Diene polymer S | 70 | | | | | |
| Diene polymer m | | 70 | | | | |
| Diene polymer T | | | 70 | | | |
| Diene polymer U | | | | 70 | | |
| Diene polymer n | | | | | 70 | |
| S-SBR(*6) | | | | | | 70 |
| NR (RSS #3) | 30 | 30 | 30 | 30 | 30 | 30 |
| Tensile strength | 297 | 302 | 314 | 320 | 325 | 254 |
| Wear resistance | 166 | 173 | 150 | 141 | 148 | 100 |
| Wet skid resistance | 100 | 101 | 104 | 106 | 110 | 100 |

C. Ex: Comparative Example
(Note)
(*6)S-SBR: SBR obtained by polymerization used Li catalyst (a styrene content 15%, a 1,2-vinyl content 36%)
*Block polystyrene content
S: 1.1%
T: 2.0%
U: 3.4%

What we claim is:

1. A process for producing a diene polymer which comprises polymerizing a conjugated diene monomer or a mixture of the conjugated diene monomer and an aromatic vinyl monomer in a hydrocarbon solvent using a composite initiator containing an alkaline earth metal, reacting 10 to 50% of all active ends of the obtained active diene polymer with (a) at least one compound selected from the group consisting of $CO_2$ and $CS_2$, until the trans-1,4 bond content of the resulting diene polymer is not less than 75% by weight, and the weight-average molecular weight of the diene polymer is in the range of from 200,000 to 600,000; and reacting 50 to 10% of all active ends of the obtained diene polymer with (b) N-substituted aminoketone, N-substituted thioaminoketone, N-substituted aminoaldehyde, N-substituted thioaminoaldehyde or a compound having an atomic group in a molecule represented by the formula —C(=M)—N< (wherein M denotes an oxygen atom or a sulfur atom.

2. The process of claim 1 which comprises polymerizing a mixture of the conjugated diene monomer and the aromatic vinyl monomer at a diene monomer:vinyl monomer weight ratio of from 95:5 to 80:20.

3. The process of claim 2 wherein the conjugated diene monomer and aromatic vinyl monomer are polymerized such that the block styrene content is not more than 1% by weight.

4. The process of claim 1 wherein from 10 to 50% of all active ends of the active diene polymer are reacted with (a) $CO_2$ and from 50 to 10% of all active ends of the diene polymer are reacted with (b) the compound having an atomic group in its molecule represented by the formula —C(=M)—N<, wherein M denotes an oxygen atom.

5. A process for producing a diene polymer, which comprises polymerizing a conjugated diene polymer or a mixture of the conjugated diene monomer and an aromatic vinyl monomer in a hydrocarbon solvent using a composite initiator containing an alkaline earth metal, reacting 10 to 50% of all active ends of the obtained active diene polymer with (a) $CO_2$, and reacting 50 to 10% of all active ends of the obtained diene polymer with compound (b) which is selected from the group consisting of N-methyl-2-pyrrolidone, N-tert-butyl-2-pyrrolidone, N-phenyl-2-pyrrolidone, N-methyoxyphenyl-2-pyrrolidone, N-vinyl-2-pyrrolidone, N-benzyl-2-pyrrolidone,, N-naphthyl-2-pyrrolidone, N-methyl-5-methyl-2-pyrrolidone, N-tert-butyl-5-methyl-2-pyrrolidone, N-phenyl-5-methyl-2-pyrrolidone, N-phenyl-5-methyl-2-pyrrolidone, N-methyl-3,3'-dimethyl-2-pyrrolidone, N-tert-3,3'-dimethyl-2-pyrrolidone, and N-phenyl-3,3'-dimethyl-2-pyrrolidone.

6. The process of claim 4 wherein compound (b) is N-methyl-2-pyrrolidone.

* * * * *